US010009168B2

(12) United States Patent
Howard

(10) Patent No.: US 10,009,168 B2
(45) Date of Patent: Jun. 26, 2018

(54) SYSTEM AND METHOD FOR SECURE COMMUNICATIONS AND DATA STORAGE USING MULTIDIMENSIONAL ENCRYPTION

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 660 days.

(21) Appl. No.: 14/091,050

(22) Filed: Nov. 26, 2013

(65) Prior Publication Data

US 2016/0226658 A1 Aug. 4, 2016

Related U.S. Application Data

(60) Provisional application No. 61/729,889, filed on Nov. 26, 2012.

(51) Int. Cl.
*H04L 9/06* (2006.01)
*H04L 9/14* (2006.01)

(52) U.S. Cl.
CPC .......... *H04L 9/0618* (2013.01); *H04L 9/0637* (2013.01); *H04L 9/14* (2013.01); *H04L 2209/24* (2013.01)

(58) Field of Classification Search
CPC ....... H04L 9/0618; H04L 9/14; H04L 9/0637; H04L 2209/24
See application file for complete search history.

(56) References Cited

U.S. PATENT DOCUMENTS

| 6,185,679 | B1* | 2/2001 | Coppersmith | .......... H04L 9/002 380/37 |
| 2002/0021801 | A1* | 2/2002 | Shimoyama | .......... H04L 9/0625 380/29 |
| 2007/0076868 | A1* | 4/2007 | Ming | ...................... G09C 5/00 380/54 |
| 2007/0180513 | A1* | 8/2007 | Raz | .................. H04L 29/12481 726/12 |

(Continued)

FOREIGN PATENT DOCUMENTS

EP 0982894 B1 10/2006

OTHER PUBLICATIONS

PCT Patent Application PCT/US2013/072065 International Search Report and Written Opinion dated Mar. 6, 2014.

*Primary Examiner* — Meng Li
(74) *Attorney, Agent, or Firm* — Lathrop Gage LLP

(57) ABSTRACT

An encryption system and method has processors and a memory system, the memory system configured to hold at least one macroblock, an encryption key, and machine readable instructions for encrypting the macroblock. The instructions include instructions for dividing the macroblock into at subblocks by rows and encrypting the rows, for dividing the macroblock into subblocks by columns and encrypting the columns, and for performing a combining cipher of the first, second, third and fourth cipher blocks to produce a final ciphertext of the macroblock. In alternative embodiments, the macroblock is divided in a third, or fourth dimension in addition to rows and columns. In embodiments, ciphertext is chained by using it ciphertext as part of a key for later macroblocks of a sequence, or propagated into later sequences of macroblocks.

19 Claims, 12 Drawing Sheets

(56) References Cited

U.S. PATENT DOCUMENTS

| | | | |
|---|---|---|---|
| 2007/0237327 A1 | 10/2007 | Taylor et al. | |
| 2008/0192924 A1* | 8/2008 | Shang | H04L 9/0618 380/28 |
| 2009/0110193 A1 | 4/2009 | Schlomer | |
| 2009/0279697 A1* | 11/2009 | Schneider | H04L 9/0637 380/37 |
| 2010/0054461 A1* | 3/2010 | Ciet | H04L 9/002 380/29 |
| 2010/0098244 A1 | 4/2010 | Ciet et al. | |
| 2010/0146303 A1* | 6/2010 | Kothari | G06F 12/1408 713/193 |

* cited by examiner

Fig. 5 2D CBC

SYSTEM AND METHOD FOR SECURE COMMUNICATIONS AND DATA STORAGE USING MULTIDIMENSIONAL ENCRYPTION

RELATED APPLICATIONS

This application claims priority to U.S. Patent Application Ser. No. 61/729,889, filed Nov. 26, 2012, the disclosure of which is incorporated herein by reference.

FIELD

The present document relates to the field of block cyphers, including chaining block cyphers, for use in secure communications and data storage systems.

BACKGROUND

Secure communications systems and data storage systems have had great importance for military and diplomatic users for many years. These systems generally rely on physical security, where information is not accessible to unauthorized users in any form, and on encryption, where information is rendered illegible by application of some function before transmission or storage, and the function is reversed upon receipt or retrieval. Since a communications channel between two parties may often be tapped, as in the case of telephone, telegraph, and radio communications, encryption of such communications is particularly common where information being transmitted could be of high value to third parties. Similarly, information, whether data or computer programs, is often encrypted for storage to prevent access by unauthorized parties.

Secure communications are of importance outside the military and diplomatic corps also. In the banking industry, a malicious party who broke into the teller-machine networks, into the credit and debit card networks, or into bank account databases could conceivably access large sums of money. Similarly, it is desirable to keep medical records secure from those not involved in care of particular patients.

Many entities, including friendly and hostile governments, have invested heavily in cryptanalysis, the breaking into secure communications and data storage systems of other parties. Successful decryption of Japanese "Purple", Japanese naval codes, and German Enigma cyphers by the Allies, and decryption of British merchant-marine codes by Germans all played an important part in World War II, just as decryption of the Zimmerman telegram played a part in dragging the United States into World War I. Hardware and software capable of breaking into many older, lower-security systems, like the "WEP" system commonly used for encrypting 802.11B/G wireless computer networks, is commonly available. Since computerized cryptanalysis technology is continually advancing, it is desirable to find better, more secure, yet faster, systems for encrypting and decrypting both communications and stored data.

Historical cipher systems often had two or more levels of security; for example the Naval version of the Enigma system used by Germany in World War II had a general level and an "officer-only" level. In that system, some high-security messages were enciphered first with an "officer-only" key, then an additional header was added and the message re-enciphered with a general-use key.

SUMMARY

An encryption system and method has processors and a memory system, the memory system configured to hold at least one macroblock, an encryption key, and machine readable instructions for encrypting the macroblock. The instructions include instructions for dividing the macroblock into at subblocks by rows and encrypting the rows, for dividing the macroblock into subblocks by columns and encrypting the columns, and for performing a combining cipher of the first, second, third and fourth cipher blocks to produce a final ciphertext of the macroblock. In alternative embodiments, the macroblock is divided in a third, or fourth dimension in addition to rows and columns. In embodiments, ciphertext is chained by using it ciphertext as part of a key for later macroblocks of a sequence, or propagated into later sequences of macroblocks.

In an embodiment, an encryption system has processors and a memory system, the memory system configured to hold at least one macroblock, an encryption key, and machine readable instructions for encrypting the macroblock. The instructions include instructions for dividing the macroblock into at subblocks by rows and encrypting rows, for dividing the macroblock into subblocks by columns and encrypting the columns, and for performing a combining cipher of the first, second, third and fourth cipher blocks to produce a final ciphertext of the macroblock.

In another embodiment, a method of encryption using a least one processor and at least one memory system, the memory system configured to hold at least one macroblock, an encryption key, and machine readable instructions for encrypting the macroblock, includes dividing the macroblock into at least a first and a second subblock by rows; dividing the macroblock into at least a third and a fourth subblock by columns; deriving a first subkey, a second subkey, and a third subkey from the key; performing a block cipher on the first and second subblock according to row keys derived from the first subkey to produce first and second cipher blocks; performing a block cipher on the third and fourth subblock according to column keys derived from the second subkey to produce third and fourth cipher blocks; and performing a combining cipher of the first, second, third and fourth cipher blocks to produce a final ciphertext of the macroblock.

BRIEF DESCRIPTION OF THE FIGURES

FIG. 5 is a block diagram illustrating a two-dimensional chaining, or propagating, block cipher.

DETAILED DESCRIPTION OF THE EMBODIMENTS

Figure 1:
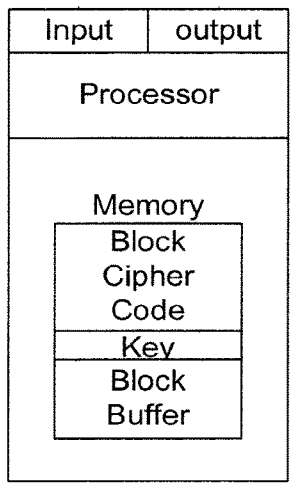
FIG. 1 is a block diagram of a prior art device for encrypting or decrypting a communications signal stream.

An encrypted communications cipher machine, as illustrated in FIG. 1, receives an unencrypted input and produces an encrypted output. The machine typically has a processor and a memory, the memory being configured with machine readable code for executing an encryption method and for retaining an encryption key for use in performing encryption. A typical system also has a block buffer in the memory into which a block of data is received from the input, the processor executes the encryption method on data in the buffer using the key, and then transmits the block as encrypted output.

Figure 2:
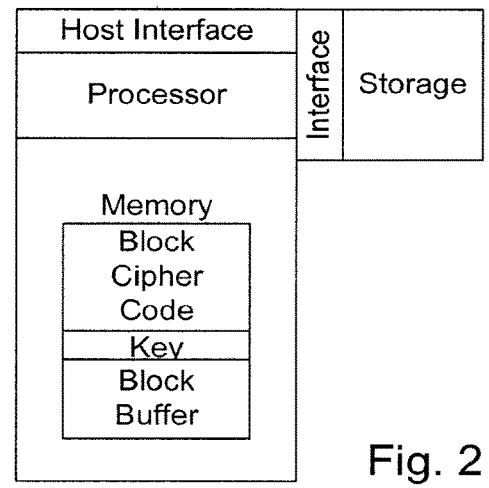
FIG. 2 is a block diagram of a prior art device for encrypted data storage.

An encrypted data storage device, as illustrated in FIG. 2, receives an unencrypted input, stores data in permanent or removable media in encrypted form, and returns unencrypted data to a host system. The machine typically has a processor and a memory, the memory being configured with machine readable code for executing an encryption method and a compatible decryption method and for retaining an encryption key for use in performing encryption; the encryption key may be stored in volatile memory. A typical system also has a block buffer in the memory into which a block of data is received from the host system. The processor executes the encryption method on data in the buffer using the key then stores the block as encrypted data on the storage device. When data is desired by a host system, the processor controls reading of blocks of the encrypted data from storage device into the buffer, executes the decryption method to transform the block in the buffer to unencrypted data, and returns the unencrypted data to the host.

Figure 3:
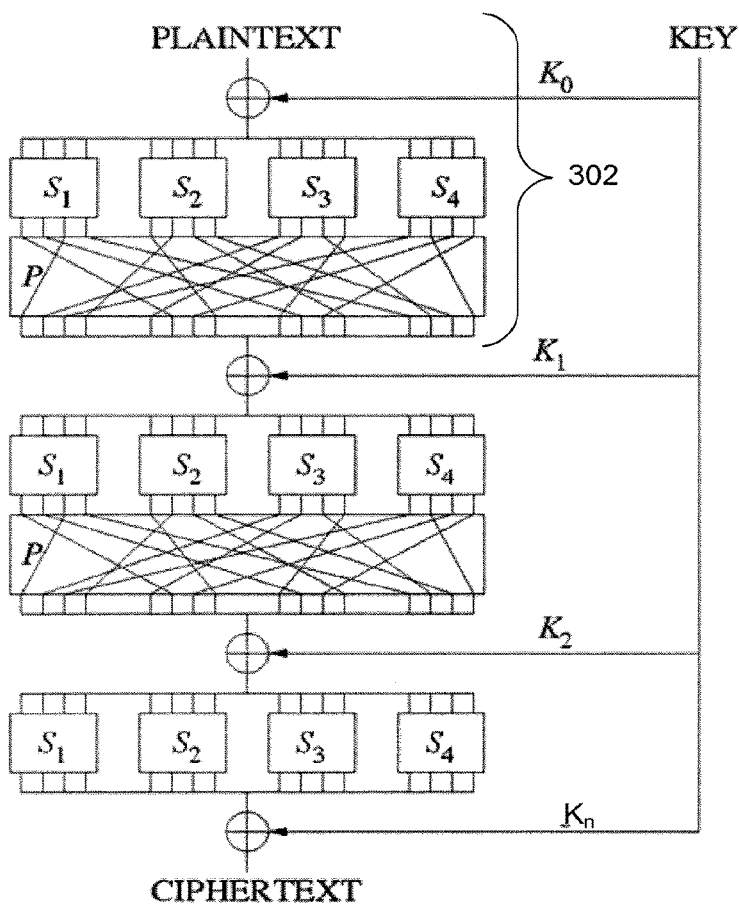
FIG. 3 is a block diagram illustrating a prior art block cipher including transposition and substitution boxes.

A prior-art block cipher encryption method useful in the systems of FIG. 1 or FIG. 2 is illustrated in FIG. 3. This cipher method generates a sequence of round keys K(0 . . . $K_n$) from the key. A round function 302 includes a key-controlled transformation of buffer data, followed by "substitution box" where sections of buffer data are replaced with transformed data, which may or may not be key-controlled, and a "permutation box" where an order of buffer data bits is scrambled in a determinable pattern, which may or may not be key-controlled. The round function is iterated for each round key K(i) (i=0 to n) in order to encrypt each block. This illustrated block cipher method is just one of many possible block ciphers.

A block cipher generally is two paired algorithms, one for encryption, E(b,k), and the other for decryption, D(c,k). Both algorithms accept two inputs: an input block b of size n bits and a key k of size k bits, and both yield an n-bit output block, such as ciphertext block c. The decryption algorithm D(c,k) is defined to be the inverse function of encryption: $D=E^{-1}$. Block ciphers may be implemented in many ways, and certain specific block ciphers are common fundamental units in encryption systems. Some block ciphers incorporate combinations of substitutions and permutations in a round function and repeat the round function multiple times during encryption of each block.

Multi-Dimensional Block Cipher Mode Encryption

Figure 3A:
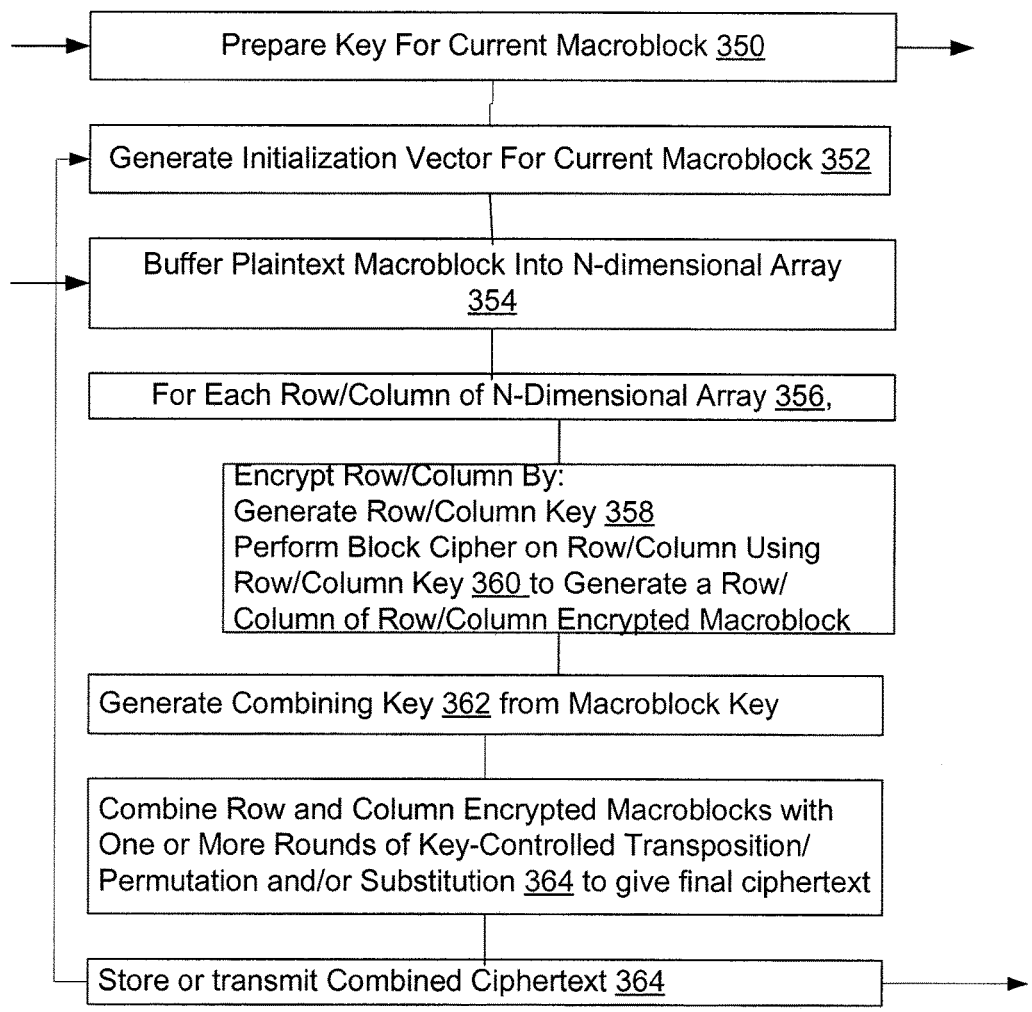
FIG. 3A is a flowchart of a generic multidimensional encryption as described herein.

A multidimensional block cipher method is illustrated in FIG. 3A. This method begins with generating (350) a macroblock key for encrypting the current macroblock. In an embodiment, the macroblock key is generated from a session master key. A macroblock initialization vector may also be generated 352. In electronic codebook implementations, the initialization vector may be a constant or derived from the macroblock key; in block-chaining, propagating, or similar embodiments, the initialization vector may be derived from a prior block or a prior message.

Next, the macroblock cipher begins with buffering a large block of data to be encrypted, herein referenced as a macroblock. A linear representation of the extended plaintext macroblock bit(1 . . . x) is mapped into "y" multiple linear blocks of length x/y.

TABLE 1

Example 2-Dimensional Representation of Full Plaintext Macroblock

| Bit 1 | Bit 2 | Bit 3 | Bit 4 | Bit 5 | Bit 6 | Bit 7 | Bit 8 | ... | x/y |
|---|---|---|---|---|---|---|---|---|---|
| Bit (1 + x/y) | Bit (2 + x/y) | Bit (3 + x/y) | Bit (4 + x/y) | Bit (5 + x/y) | Bit (6 + x/y) | Bit (7 + x/y) | Bit (8 + x/y) | ... | 2(x/y) |
| Bit (1 + 2(x/y)) | Bit (2 + 2(x/y)) | Bit (3 + 2(x/y)) | Bit (4 + 2(x/y)) | Bit (5 + 2(x/y)) | Bit (6 + 2(x/y)) | Bit (7 + 2(x/y)) | Bit (8 + 2(x/y)) | ... | 3(x/y) |
| Bit (1 + 3(x/y)) | Bit (2 + 3(x/y)) | Bit (3 + 3(x/y)) | Bit (4 + 3(x/y)) | Bit (5 + 3(x/y)) | Bit (6 + 3(x/y)) | Bit (7 + 3(x/y)) | Bit (8 + 3(x/y)) | ... | 4(x/y) |
| Bit (1 + 4(x/y)) | Bit (2 + 4(x/y)) | Bit (3 + 4(x/y)) | Bit (4 + 4(x/y)) | Bit (5 + 4(x/y)) | Bit (6 + 4(x/y)) | Bit (7 + 4(x/y)) | Bit (8 + 4(x/y)) | ... | 5(x/y) |
| Bit (1 + 5(x/y)) | Bit (2 + 5(x/y)) | Bit (3 + 5(x/y)) | Bit (4 + 5(x/y)) | Bit (5 + 5(x/y)) | Bit (6 + 5(x/y)) | Bit (7 + 5(x/y)) | Bit (8 + 5(x/y)) | ... | 6(x/y) |
| Bit (1 + 6(x/y)) | Bit (2 + 6(x/y)) | Bit (3 + 6(x/y)) | Bit (4 + 6(x/y)) | Bit (5 + 6(x/y)) | Bit (6 + 6(x/y)) | Bit (7 + 6(x/y)) | Bit (8 + 6(x/y)) | ... | 7(x/y) |
| Bit (1 + 7(x/Y)) | Bit (2 + 7(x/Y)) | Bit (3 + 7(x/Y)) | Bit (4 + 7(x/Y)) | Bit (5 + 7(xY)) | Bit (6 + 7(x/Y)) | Bit (7 + 7(x/Y)) | Bit (8 + 7(x/Y)) | ... | 8(x/y) |
| ... | ... | ... | ... | ... | ... | ... | ... | ... | ... |

TABLE 1-continued

Example 2-Dimensional Representation of Full Plaintext Macroblock

| Bit 1 | Bit 2 | Bit 3 | Bit 4 | Bit 5 | Bit 6 | Bit 7 | Bit 8 | ... | x/y |
|---|---|---|---|---|---|---|---|---|---|
| Bit (1 + (x − 1) (x/y)) | Bit (2 + (x − 1) (x/y)) | Bit (3 + (x − 1) (x/y)) | Bit (4 + (x − 1) (x/y)) | Bit (5 + (x − 1) (x/y)) | Bit (6 + (x − 1) (x/y)) | Bit (7 + (x − 1) (x/y)) | Bit (8 + (x − 1) (x/y)) | ... | x(x/y) |

This step essentially involves taking a large block, or macroblock, of plaintext and placing plaintext from the block into an array of N (the encryption dimensionality) dimensions. An illustration of this process is given in Table 1, assuming that N is 2. In an embodiment, the plaintext of the macroblock is distributed into the array as rows or columns of bits. In an alternative embodiment, the plaintext of the macroblock is distributed into the array as rows or columns of characters or bytes.

For example, a 100-byte block may be mapped as a 10 by 10 2-dimensional array, a 1000-byte block as a 10-by-10-by-10 3-dimensional array, and a 400-byte block as a 20 by 20 2-dimensional array.

It should be noted that, while two dimensions, involving rows and columns, are shown in the figures, this is for simplicity of representation; it is intended that any of the embodiments herein described may be built with two, three, four, or more dimensions. Further, while one row and one column is shown in each figure for simplicity, the number of rows or columns in any of the embodiments will be an integer number greater than one of rows, with an integer number greater than one of columns.

Embodiments having three dimensions may divide macroblocks into planes, and then further subdivide the macroblocks into rows and columns within each plane.

Once the macroblock is buffered in the array, in block chaining or propagating embodiments, the initialization vector is applied. In a particular embodiment, the vector is XOR-ed with the plaintext in the array.

The multidimensional encryption continues by encrypting data from the macroblock array into a row-encrypted macroblock array by, for 356 each row of the array, generating a row key 358 from the macroblock key and performing a block cipher 360 on the row using the row key. This produces a row-encrypted macroblock.

The multidimensional encryption also encrypts data from the macroblock array into a column-encrypted macroblock array by, for 356 each column of the array, generating a column key 358 from the macroblock key and performing a block cipher 360 on the column using the column key. This produces a column-encrypted macroblock.

For each dimension beyond two, the multidimensional encryption also encrypts data from the macroblock array into an additional encrypted macroblock array, such as a plane-encrypted macroblock, by, for 356 each additional dimension of the array, generating additional row and column keys 358 from the macroblock key and performing a block cipher 360 on each row and column of each plane in the additional dimension using the additional generated row and column keys. This produces an additional encrypted macroblock for each dimension, such as a plane-encrypted macroblock. In a three-dimensional encryption, each plane of the encrypted macroblock may include multiple row-encrypted and column encrypted blocks.

Next, the row-encrypted, column-encrypted, and additional encrypted macroblocks for each additional dimension are further encrypted and combined 364 to generate a combined ciphertext using a combination key derived 362 from the macroblock key and a combining method including at least one round of key-dependent transposition/permutation or transposition/permutation-substitution.

To ensure that each dimension is orthogonal, the row and column encryptions performed for each dimension each has its own key (or subkey) and vectors. In an embodiment, individual row keys are derived from predetermined row-key bits of the macroblock key, individual column keys are derived from nonoverlapping, predetermined, column-key bits of the macroblock key, and the combining key is derived from nonoverlapping, predetermined, combining-key bits of the macroblock key.

Once the row and column encrypted macroblocks have been combined to create combined final ciphertext, this ciphertext is recorded on storage media or transmitted over a communications medium to a receiving system where the ciphertext may be decrypted.

In some chaining and/or propagating embodiments, the generated final ciphertext is used in turn to generate 352 an initialization vector for the following block.

This leads to the following multi-dimensional definitions of the standard block cipher mode encryptions.

Multi-Dimensional Electronic Codebook (ECB) Mode Encryption

Figure 4:
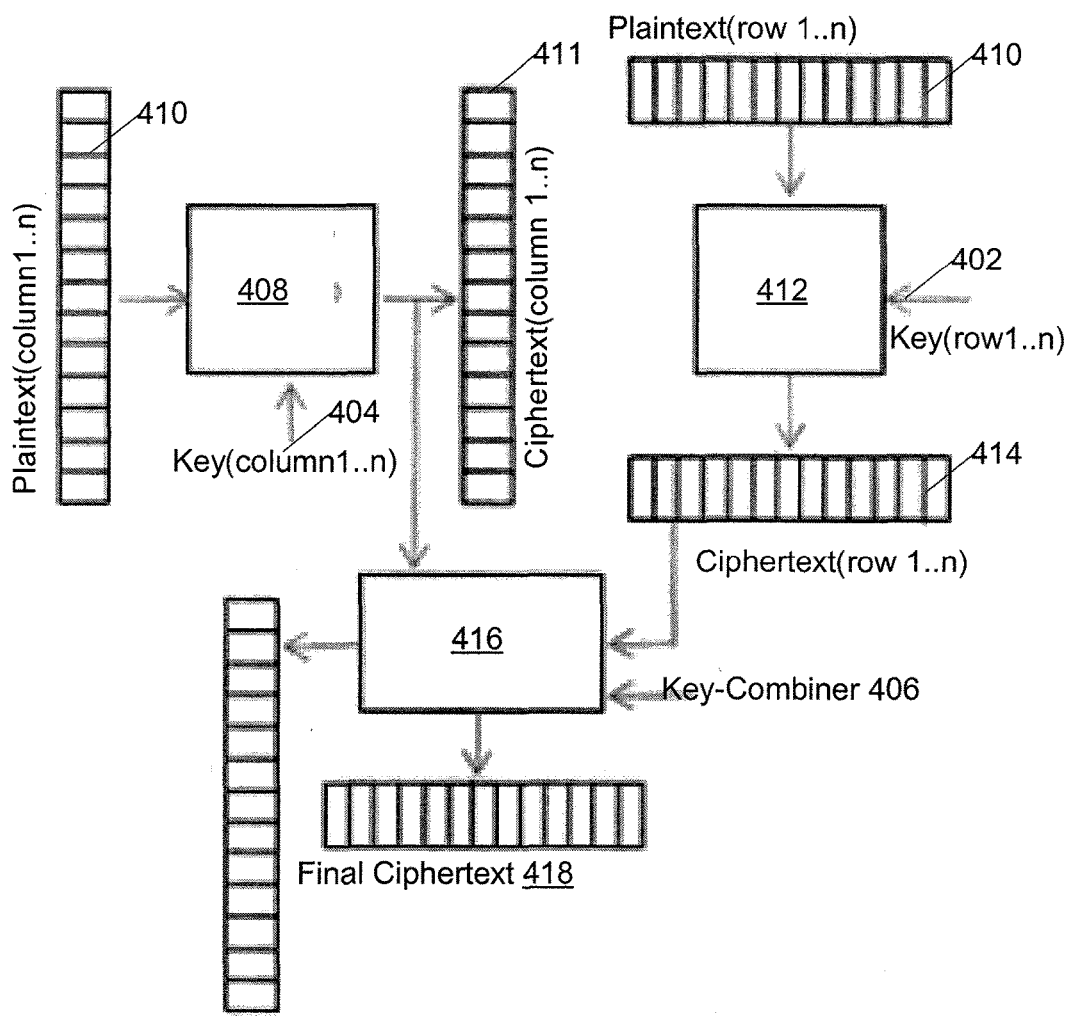
FIG. 4 is a block diagram illustrating a basic two-dimensional electronic codebook block cipher.

FIG. 4 shows an example of a two-dimensional electronic codebook mode encryption scheme. A two-dimensional ECB creates ciphertext that is twice the size of the plaintext and a three-dimensional ECB creates a ciphertext that is three times the size of the plaintext. This is because the ciphertext forms a tuple: C(row, column) for two dimensions or C(row, column, depth) for three dimensions.

In the 2-dimensional ECB there is one key or subkey per row 402 and one key or subkey per column 404. The keys or subkeys can be related to a single, exposed master key for the row ($Key_{row[1]}$) and a single, exposed master key for the column ($Key_{column[1]}$). This concept can be extended to any number of dimensions. In effect, multiple, parallel block encryptions are performed in each dimension. The simplest way to relate the non-master keys with the master key is to add the dimension index to each non-master key. For example, a row could have the following keys: $Row_{master+1}$, $Row_{master+2}$, ..., $Row_{master+y}$. Any number of dimensions can be used in the creation of a cipher. There is also a combiner key 406.

Any relationship between a row and a column master key and the non-master row-specific and column-specific keys is possible as long as a unique new key is formed and the process is reversible (for decryption). In a particular embodiment, the row and column master keys are fields of a session master key. In another embodiment, the row and column keys are derived by executing a hashing algorithm on a session master key.

In general, the following ciphertext to plaintext relationship holds for multi-dimensional block cipher mode encryption:

$$E = p \qquad \text{Eqn. 1}$$

Where E=ciphertext bit size, p=plaintext bit size.

The encryption/decryption time is far less for the higher dimensional encryption/decryption models. FIG. 4 shows the effect of adding keyed permutation boxes to the ECB mode encryption.

$$D_{Key} = \text{key}_{dim(1)} \oplus \text{key}_{dim(2)} \ldots \oplus \text{key}_{dim(n)} \qquad \text{Eqn. 2}$$

$$P_d = D_{key}, \bmod(D_p) \qquad \text{Eqn. 3}$$

Where: $P_d$=Selected dimensional permutation, $D_p$=# dimensional permutations, mod( )=arithmetic modulus function, and $\text{key}_{dim(x)}$=a key for dimension x.

Therefore, a column block cipher 408, controlled by the column keys 404, is executed 360 on each column of a macroblock of plaintext 410 to form column ciphertext 411. Similarly, a row block cipher 412, controlled by row keys 402, is executed on each row of the macroblock of plaintext 410 to form row ciphertext 414.

Figure 5A:
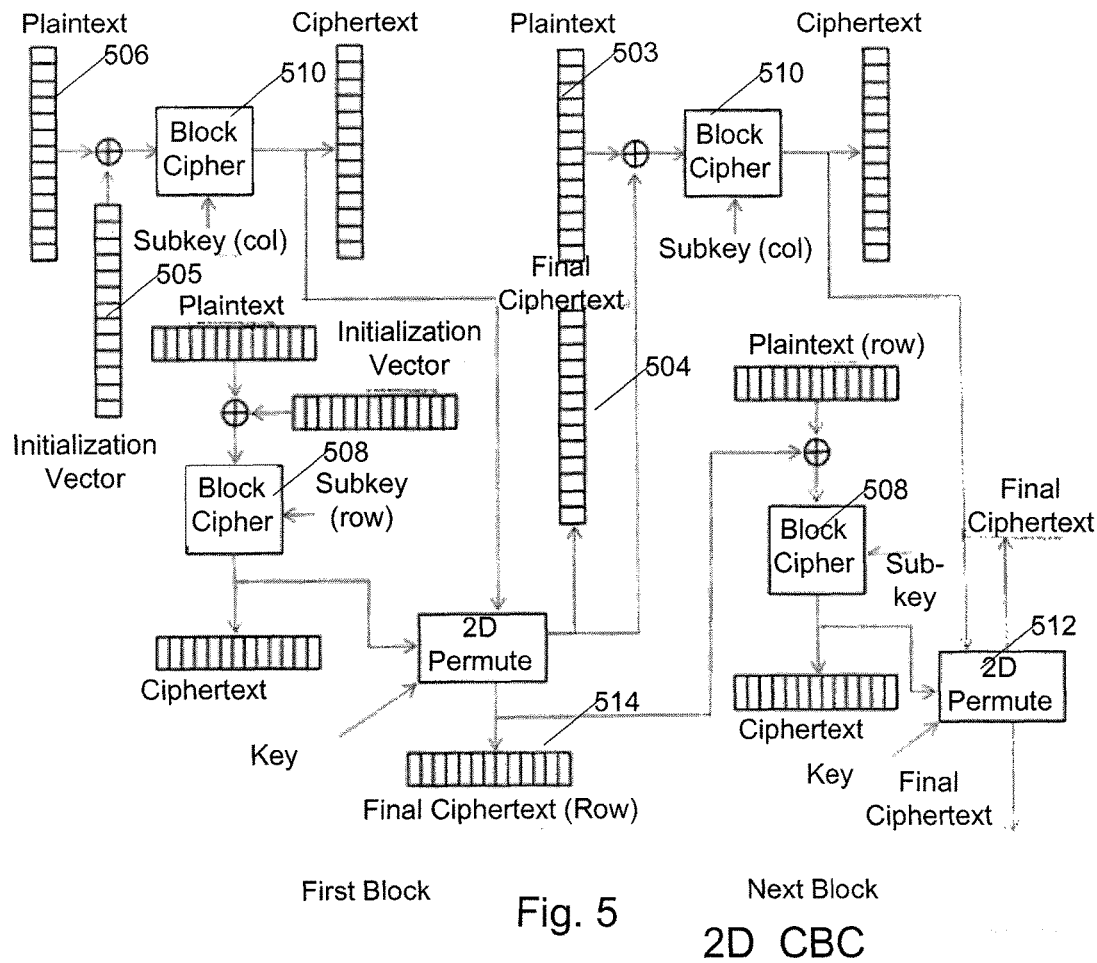
FIG. 5A is an exemplary schematic of a two-dimensional permutation block.

A 2-dimensional permutation box such may be used for, or as part of, the combining function 364 or unit 416. Consider that as long as both dimensions are the same size then permutations of two of those dimensions can be implemented as a mathematical transposition as shown in FIG. 5a between a column$_x$, and a row$_x$. Once a transposition is set up, a permutation can occur simultaneously by interchanging some bits within the same column or same row instead of swapping them between row to column. Further, some bits may be transposed between columns, or between rows. An additional round of substitution and permutation may in some embodiments be performed by the combiner. The combiner produces final ciphertext 418.

Since the dimensional permutation is a factorial of the dimension count, it becomes possible to select a different permutation based on which dimensions are transposed and permutated. Permuting the dimensions adds cross-dimensional information to the cipher. This offers a unique way to also increase the Shannon Confusion, further increasing the strength of the encryption. Notice that other than the multi-dimensional permutation box, all encryption/decryption work is parallel. This inherent parallelism coupled with the fact that the effective encryption bit size is equal to multiplying all of the dimension sizes together means the encryption/decryption time is much shorter for any selected key bit length. For example, to obtain the equivalent of 256 bit encryption/decryption would be:

$$T = T_e + T_d \qquad \text{Eqn 4}$$

Where $T_e$=Encryption-time(squareroot(256))+"2-dimensional permutation time" Eqn 5

$T_d$=Decryption-time(squareroot(256))+"2-dimensional permutation time" Eqn 6

Versus, $$T' = T'_e + T'_d \qquad \text{Eqn. 7}$$

Where T'$_e$=Encryption-time(256), and T'$_d$=Decryption-time (256).

In general, the total time T is given by the following:

$$T = T_e + T_d \qquad \text{Eqn. 8}$$

$$T_e = f_e(\text{root}_n(K)) + P_n(K) \qquad \text{Eqn. 9}$$

$$T_d = f_d(\text{root}_n(K)) + P_n(K) \qquad \text{Eqn. 10}$$

where: T=total encryption decryption time, $T_e$=Encryption time, $T_d$=Decryption time, K=Encryption Key Length, $P_d(K)$=n-dimensional permutation time calculator function for key length K, n=number of dimensions used encrypt/decrypt, $f_e(K)$=encryption processing time calculator for keys of length K function, $f_d(K)$=decryption processing time calculator for keys of length K function, and $\text{root}_n(\ )$=$n^{th}$ root function Thus, even though the ciphertext size grows linearly with the number of dimensions used, the ciphertext creation time for any effective key length is the root of the dimensionality of the encryption.

Chaining and Propagating Embodiments

While ECB implementations are sometimes preferable for data to be transmitted over a noisy channel because any one-bit error in an early macroblock will NOT prevent decryption of all following macroblocks, they have the undesirable property that successive macroblocks having the same data encrypt to the same ciphertext—permitting spoofing and some other attacks. While this can be limited by generating different macroblock keys from a session or message key for each block, an alternative suitable for use on low-noise communications channels or for data storage is a chaining system where ciphertext from an early macroblock is effectively used as part of the encryption key of one or more following macroblocks. This may be done in several ways.

Multi-Dimensional Cipher Block Chaining

Figure 5A:
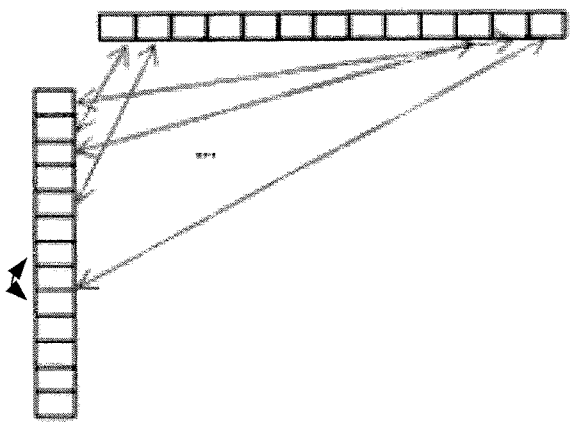

FIG. 5 shows an example of a two-dimensional Cipher Block Chaining mode encryption scheme. Block chaining uses ciphertext from each block to further encipher the following block, thereby ensuring Shannon Diffusion extends throughout the entire message, not just a single block—at penalty of corruption of all following blocks if even one bit of one block is corrupted during transmission. A two-dimensional CBC, like the two-dimensional ECB, creates a ciphertext that is twice the size of the plaintext. This is because the ciphertext forms a tuple: C(row, column) for two dimensions or C(row, column, depth) for three dimensions.

In an embodiment as illustrated, half of ciphertext 504 from an earlier block, or in an embodiment the immediately preceding block, is used as the initialization vector 504 or successive macroblocks 503. This effective initialization vector is then XOR-ed with the received plaintext macroblock 503 before the iterated row block ciphers 508 and column block ciphers 510 are performed. This ciphertext 502 is therefore used as part of a key for encrypting the current macroblock, with the initialization vector 505 used for the first block only. Ciphertext from the row block ciphers 508 and column block ciphers 510 are then combined 512 to generate final ciphertext 514 for the current macroblock, and the final ciphertext is used in encryption of the following macroblock. In an alternative embodiment, ciphertext 514 is XOR-ed with a master key to generate the macroblock key for encrypting the following macroblock 503.

Figure 6:
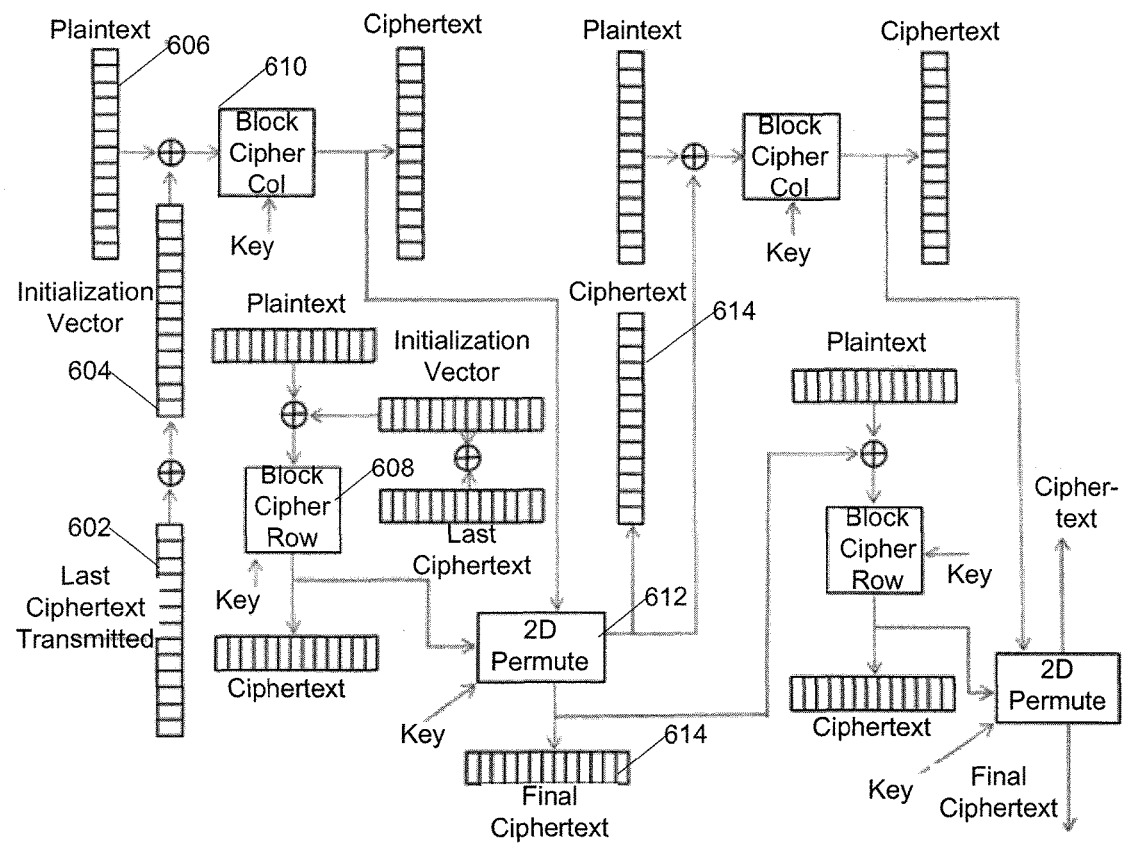
FIG. 6 is a block diagram illustrating a two-dimensional cross-session propagating block cipher.

Like the 2-dimensional ECB, the 2-dimensional CBC has one subkey per row and one subkey per column. In addition, there is one initialization vector for each column and each row. The subkeys and initialization vectors can be related to, or derived from, a single, exposed master key and master initialization vector for the rows ($\text{Key}_{row[0]}$, $\text{IV}_{row[0]}$) and a single, exposed master key and master initialization vector for the columns ($\text{Key}_{column[0]}$, $\text{IV}_{column[0]}$). All non-master keys and initialization vectors can be derived from the masters. This concept can be extended to any number of dimensions. Notice that, within an encryption session, the CBC mode encryption generates a different ciphertext for each block of plaintext, regardless of the content of the plaintext blocks. Further, notice that the initialization vector is the same for all keys and all plaintext. This means that same plaintext encrypted using the same key will produce the same ciphertext. If encryption occurs between a pair of communicating systems (encrypt—transmit—receive—decrypt) and the final, sent ciphertext is remembered at the next session, then the CBC can be made safer by expanding the block chaining such that it is no longer session bound. This changes the one or greater dimensional CBC to the MPT Cross Session CBC as shown in FIG. 6.

Multi-Dimensional Propagating Cipher Block Chaining

A common cryptanalytic attack is for an unauthorized party to record multiple messages or multiple stored files for duplicate ciphertext blocks and to maintain databases of messages and message formats. Duplicate portions may correspond to message headers and traditional forms of addressing a recipient encrypted with similar keys and can be used both to attack messages and analyze the system. Duplicate portions were helpful in the Venona breaks into reused Russian "one time pads" of the 50's and 60's. Known message formats and message headers were useful in formulating "cribs" for bombe-based key-recovery of Enigma messages during World War II.

In a high noise environment, a message or file number may be used as part of a key or initialization vector of each message in order to prevent the first portion of successive messages from encrypting into similar ciphertext. In a low noise environment, in order to prevent the first portion of successive messages from encrypting into similar ciphertext, a portion of ciphertext of a previous message or stored file may be used as part of a key for encrypting following messages or stored files in a message-propagating, macroblock-chaining embodiment.

In an embodiment as illustrated, half of ciphertext 602 from an earlier block or in an embodiment the immediately preceding block, or from the last block of an earlier message for the first macroblock of a message, is used to encipher (in some embodiments enciphered by XOR-ing, in others by piecewise modulo addition) with the initialization vector 604 to produce an effective initialization vector for the macroblock. This effective initialization vector is then XOR-ed with the received plaintext macroblock 606 before the iterated row block ciphers 608 and column block ciphers 610 are performed. This ciphertext 602 is therefore used as part of a key for encrypting the current macroblock, and a final ciphertext from a prior message as part of the key for encrypting the first macroblock. Ciphertext from the row block ciphers 608 and column block ciphers 610 are then combined 612 to generate final ciphertext 614 for the current macroblock, and the final ciphertext 614 is used in encryption of the following macroblock. In an alternative embodiment, ciphertext 602 is XOR-ed with a master key to generate the macroblock key for encrypting the macroblock.

Multi-Dimensional Cipher Feedback (CFB) Mode Encryption

Figure 7:
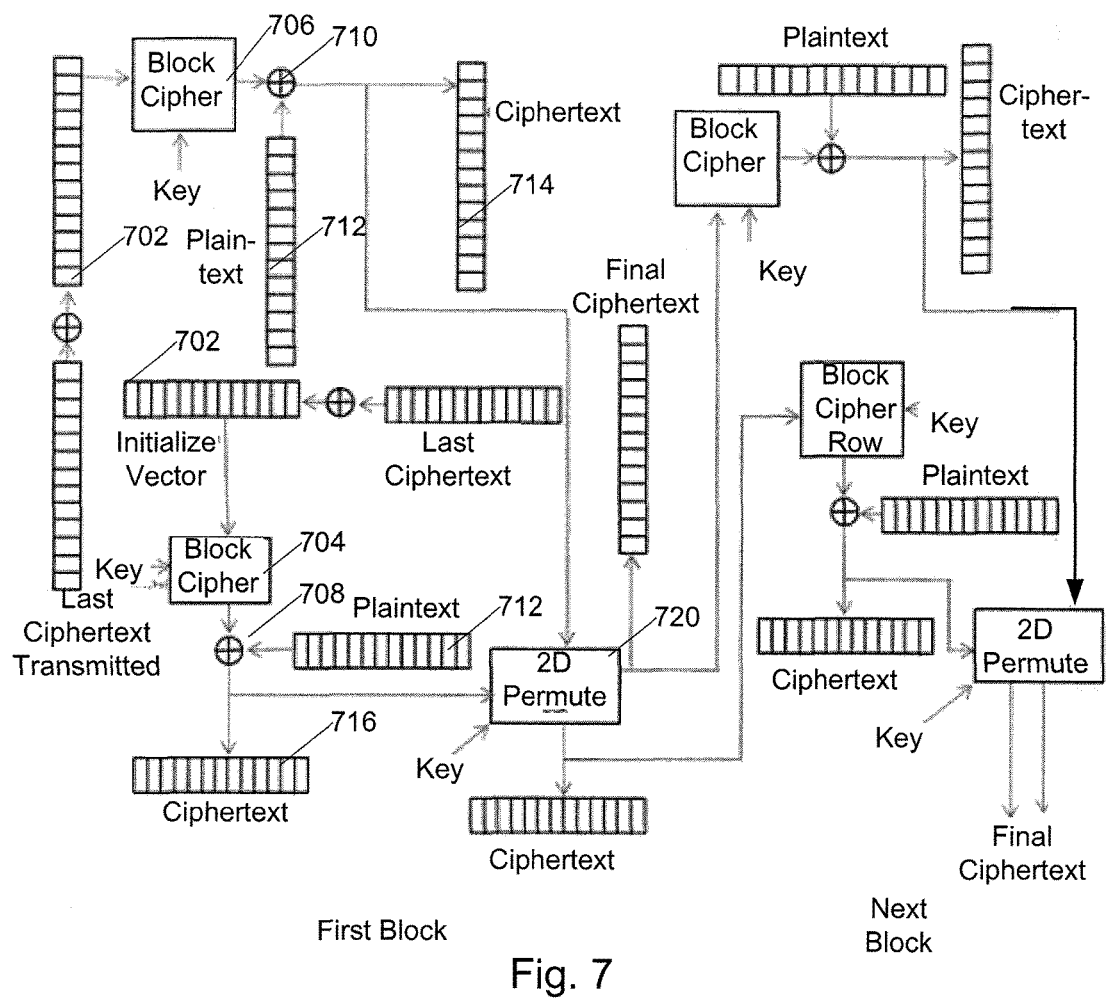
FIG. 7 is a block diagram illustrating a two dimensional cross-session chaining block cipher.

FIG. 7 illustrates an example of a two-dimensional Cipher Feedback mode encryption scheme. A 2-dimensional CFB is very similar to the 2-dimensional PCBC. Like the PCBC, it can also be expanded into an MPT Cross Session version.

Instead of performing a block cipher on plaintext according to a key, the block cipher may be run 704 on rows of the initialization vector 702 according to the row keys and run 706 on columns of the initialization vector 702 to generate scrambled row keys and scrambled column keys. The scrambled row keys and scrambled column keys are then XOR-ed 708, 710 with the rows 712 or columns 714 of plaintext to produce column 716 and row 718 ciphertexts. These column and row ciphertexts are thereupon combined 720 to generate a final ciphertext using one or more rounds of transposition/permutation and, in an embodiment, substitution, as previously described. As before, the generated ciphertext from each macroblock is used as an initialization vector for each successive macroblock.

Figure 8:
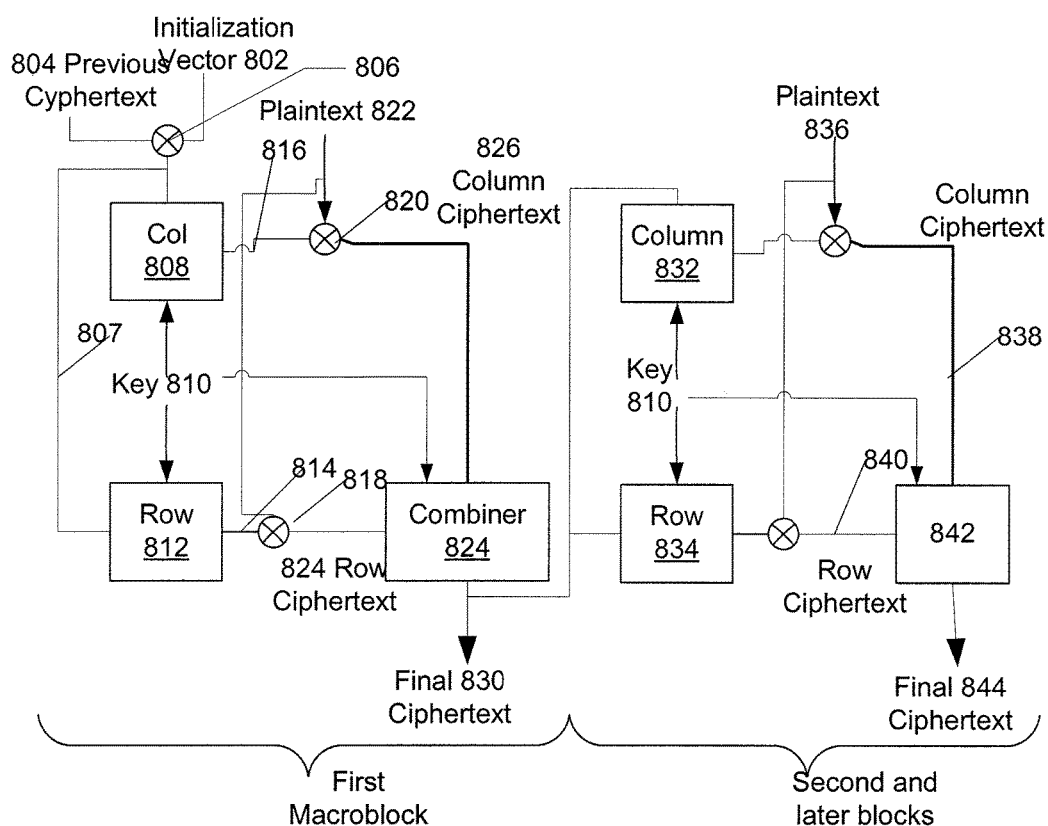
FIG. 8 is a block diagram illustrating a two-dimensional chaining output-feedback cipher.

Multi-Dimensional Cross-Session, Chaining, Cipher Feedback (CSCFB) Mode Encryption FIG. 8 illustrates an example of a two-dimensional cross-session cipher-feedback mode encryption scheme.

An initialization vector 802 is used to encipher, in an example by XOR-ing 806 a last macroblock of a previous ciphertext message 804, such as a previous message in a sequence of messages, to produce an initial block 807. When no previous message is available because messages are known to be corrupt or missing, or for a first message of a particular sequence or time period, a value selected from a table of initial values may substitute for the last macroblock of previous ciphertext.

Instead of performing a block cipher on plaintext according to a key, the block cipher may be run 808 on columns of the initial block 807 according to the row keys and also run 812 on columns of the initial block to generate scrambled row keys 814 and scrambled column keys 816. The scrambled row keys and scrambled column keys are then XOR-ed 818, 820 with the rows or columns of plaintext 822 to produce column 824 and row 826 ciphertexts. These column and row ciphertexts are thereupon combined by transposition, permutation, and substitution in key-controlled combiner 828 to generate a final ciphertext 830 using one or more rounds of transposition/permutation and, in an embodiment, substitution, as previously described. As before, the generated ciphertext 830 from each macroblock is used as an initialization vector for each successive macroblock, being subjected to column block cipher 832 and row block cipher 834. Outputs of row and column block ciphers are used to encipher, in an embodiment by XOR-ing, columns and rows respectively of a successive plaintext block 836 to form column ciphertext 838 and row ciphertext 840, which are then combined by transposition, permutation, and substitution in key-controlled combiner 842 to produce that successive macroblock's ciphertext 844. Successive ciphertext 844 is processed similarly to generate row and block keys for following macroblocks, if any, and, if there is no following macroblock of this message, introduced as the last macroblock of a preceding message 804 when processing a following message.

Multi-Dimensional Output Feedback (OFB) Mode Encryption

Figure 9:
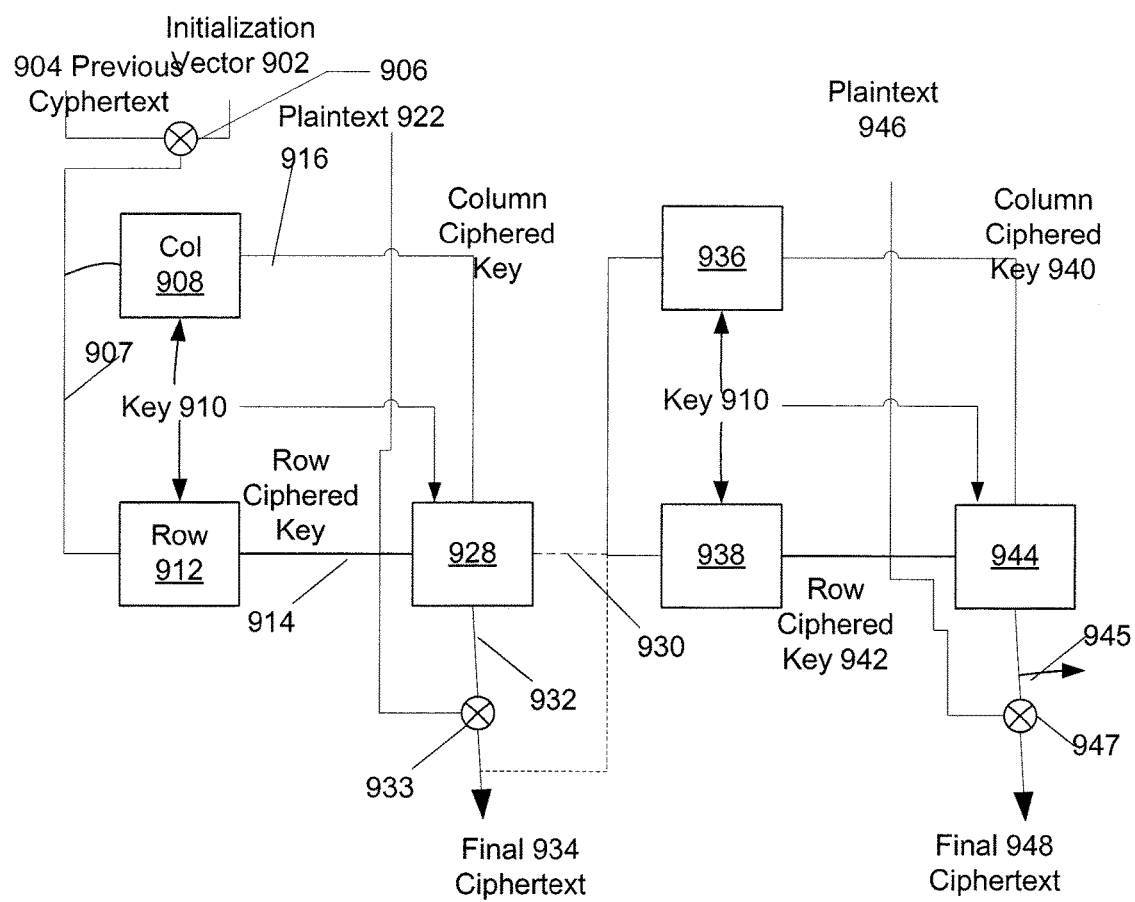
FIG. 9 is a block diagram illustrating a two-dimensional chaining output-feedback cipher.

FIG. 9 shows an example of a two-dimensional Cross-Session Output Feedback mode encryption scheme.

In this embodiment, an initialization vector 902 is used to encipher, in an example by XOR-ing 906 a last macroblock of a previous ciphertext message 904, such as a previous message in a sequence of messages, to produce an initial block 907. When no previous message is available because messages are known to be corrupt, or for a first message of a particular sequence or time period, a value selected from a table of initial values may be substituted for the last macroblock of previous ciphertext or for the enciphered previous ciphertext.

Instead of performing a block cipher on plaintext according to a key, the block cipher may be run 908 on columns of the initial block 907 according to the row keys and also run 912 on columns of the initial block to generate scrambled row keys 914 and scrambled column keys 916. The scrambled row keys and scrambled column keys are then combined by transposition, permutation, and substitution in key-controlled combiner 928 to generate a double-length final key 930 using one or more rounds of transposition/permutation and, in an embodiment, substitution, as previously described. A single-length, or row-length, excerpt 932 from the final key 930 is used to encipher 933, in an embodiment by XOR-ing, although other encipherment methods such as modulo addition may be used, a macroblock of plaintext 922 to produce a first macroblock of ciphertext 934.

As before, the generated final key 930 from each macroblock, or in an alternative embodiment the macroblock of ciphertext 934, is used as an initial block for each successive macroblock, being subjected to column block cipher 936 and row block cipher 938 to form column 940 and row 942 keys. The column and row keys are then combined by transposition, permutation, and substitution in key-controlled combiner 944 to produce that successive macroblock's final key 945. A row-length portion of final key 945 is used to encrypt 947 that macroblock's plaintext 946 to produce the successive ciphertext 948. Successive ciphertext 948 is processed similarly to generate row and block keys for following macroblocks, if any, and, if there is no following macroblock of this message, introduced as the last macroblock of a preceding message 904 when processing a following message.

In an embodiment, the key 910 is a long key having nonoverlapping fields for row and column block ciphers and for the combiner.

Multiple Levels of Security and Compartments

In both database and communications applications, there are times when an encryption system should offer multiple levels of security. For example, the Naval Enigma system of World War II had basic, general-use and officer-only keys; some particularly sensitive messages were enciphered first with the officer-only key, an additional header was then added to advise of double encryption and who was authorized to decrypt the message body, and the message was re-encrypted with the daily general-use key.

Figure 9A:
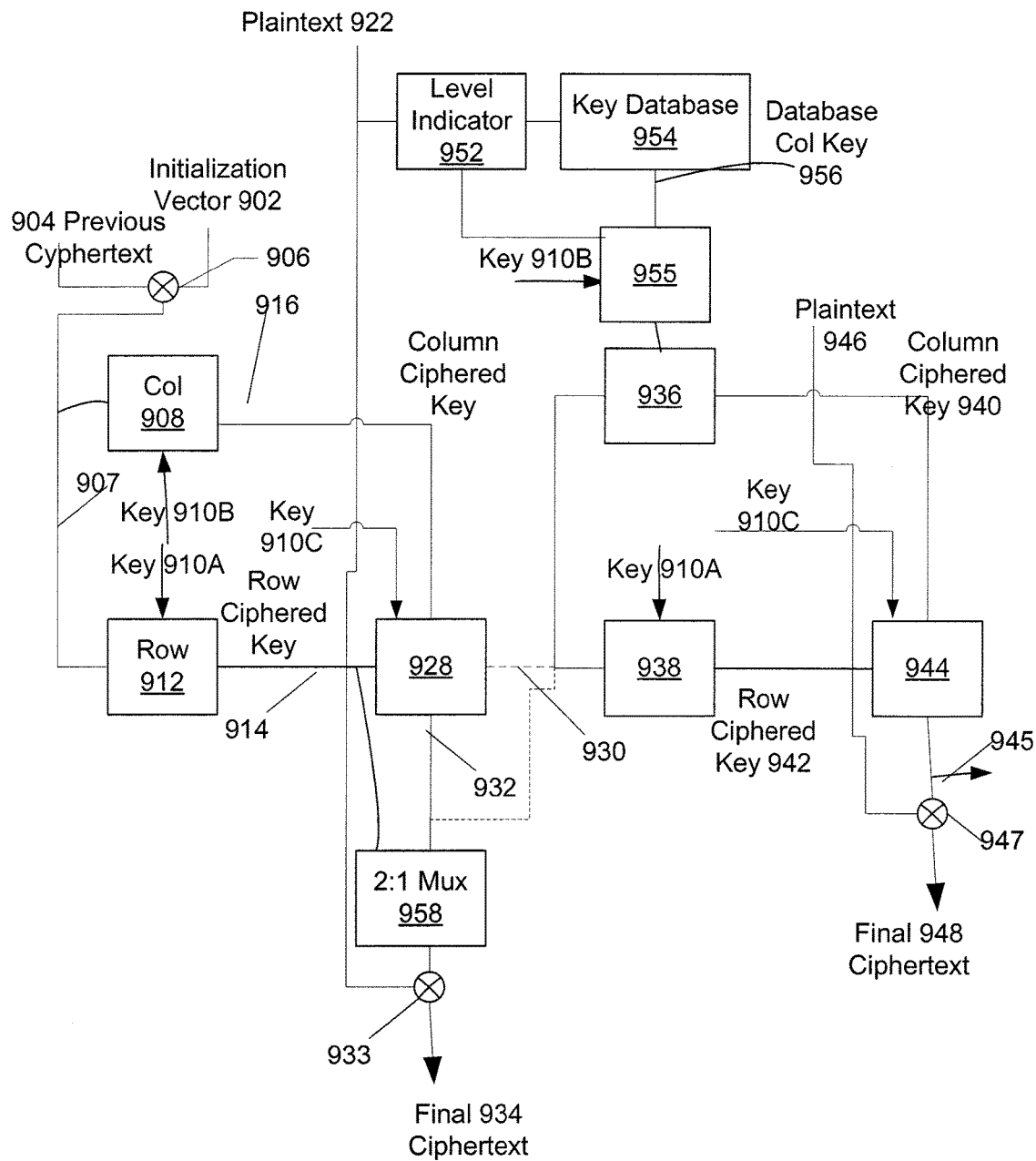
FIG. 9A illustrates the system of FIG. 9 adapted for multiple levels of security and/or compartmentalization.

The system herein described is readily adapted to support multiple levels of access both for communications and for database storage. FIG. 9A illustrates an adaptation of the system of FIG. 9 to support multiple levels of security. In this adaptation, a level indicator 952 field is incorporated into macroblocks of plaintext 922, in an embodiment level indicator 952 is incorporated into the first macroblock of a message or stored file, and in an alternative embodiment, level indicator 952 is incorporated into additional macroblocks of the file.

The first macroblock of a message or a file contains only information that is determined to be available to recipients with a first level of access. The first macroblock of the message or file is encrypted using a first-level previously-shared key, which in an embodiment is a general-use, date-dependent key and which includes a row key portion 910A, a column key portion 910B, and a combiner key portion 910C. Key database 954 is initialized with keys corresponding to levels of access and compartments of access for users intended to have access to the message or file. In this embodiment, the first macroblock is restricted to contain only information available to users authorized at the first level of security.

When a particular macroblock is to be followed by a successive macroblock that contains content intended to be available only to users authorized at a second level of security, or in a particular compartment of a compartmentalized security system, level indicator 952 is provided in the first macroblock, used as an index into key database 954, and at least one key portion, such as column key 910B, is replaced with a key 956 from key database 954 by a 2:1 multiplexor 955. In particular embodiments, additional key processing as heretofore described with reference to column and row keys is performed on key 956. In an embodiment, to add further confusion to encrypted results, a mode bit associated with each file or message may cause the first macroblock of each message or file to be encrypted only according to row-ciphered key 914 instead of combiner output 932.

Remaining blocks of FIG. 9A operate according to their description given above with reference to FIG. 9.

During decryption of messages or files that were encrypted according to the scheme of FIG. 9A, key database 954 is initialized with keys corresponding to levels of access and compartments of access to which a current user is permitted access.

During decryption of messages or files that were encrypted according to the scheme of FIG. 9A, decryption begins with a first-level key. Each macroblock decrypted is inspected to determine if it incorporates a level indicator corresponding to level indicator 952. If a level indicator is found, the level indicator is used to select an appropriate key from key database 954, which in an embodiment is a column key, and in an alternative embodiment a row key, that is used for decrypting the following macroblock. If a level indicator is found that does not correspond to a key in key database 954, an attempt is made to decrypt following macroblocks with the first-level key; if decryption is unsuccessful, it is presumed that the current user does not have authorization to access that portion of the message or file.

The system of FIG. 9A is anticipated to be of use in systems such as medical record systems, where a first level of access may allow access to certain portions of patient data, such as patient name, address, and insurance identification, a second level of access may allow access to both patient identification, current prescriptions, and hourly nursing reports, and a third level may allow access to physicians' notes, lab reports, and images as well as current prescriptions and hourly nursing reports. In this system, the key database is configured with keys according to access rights of particular users of the system—some of which may be read directly from a security pass or access card held by the user.

Similarly, the system of FIG. 9A is adaptable to use by government contractors and agencies employing a multiple-level security classification system and security compartmentalization; the key database is configured with keys according to access rights assigned to a particular user accessing the system.

The systems described with reference to FIG. 4, 5, 6, 7, or 8 may be adapted for multiple levels of security or multiple security compartments in a manner similar to that discussed herein with reference to FIG. 9A.

Multiprocessor Embodiments for Multidimensional Encryption

It is anticipated that the methods of FIG. 4-11 may execute on traditional single or multiple-processor systems as known in the art of computing, having memory configured with instructions for each step of the method and for holding plaintext and encrypted macroblocks.

Figure 10:
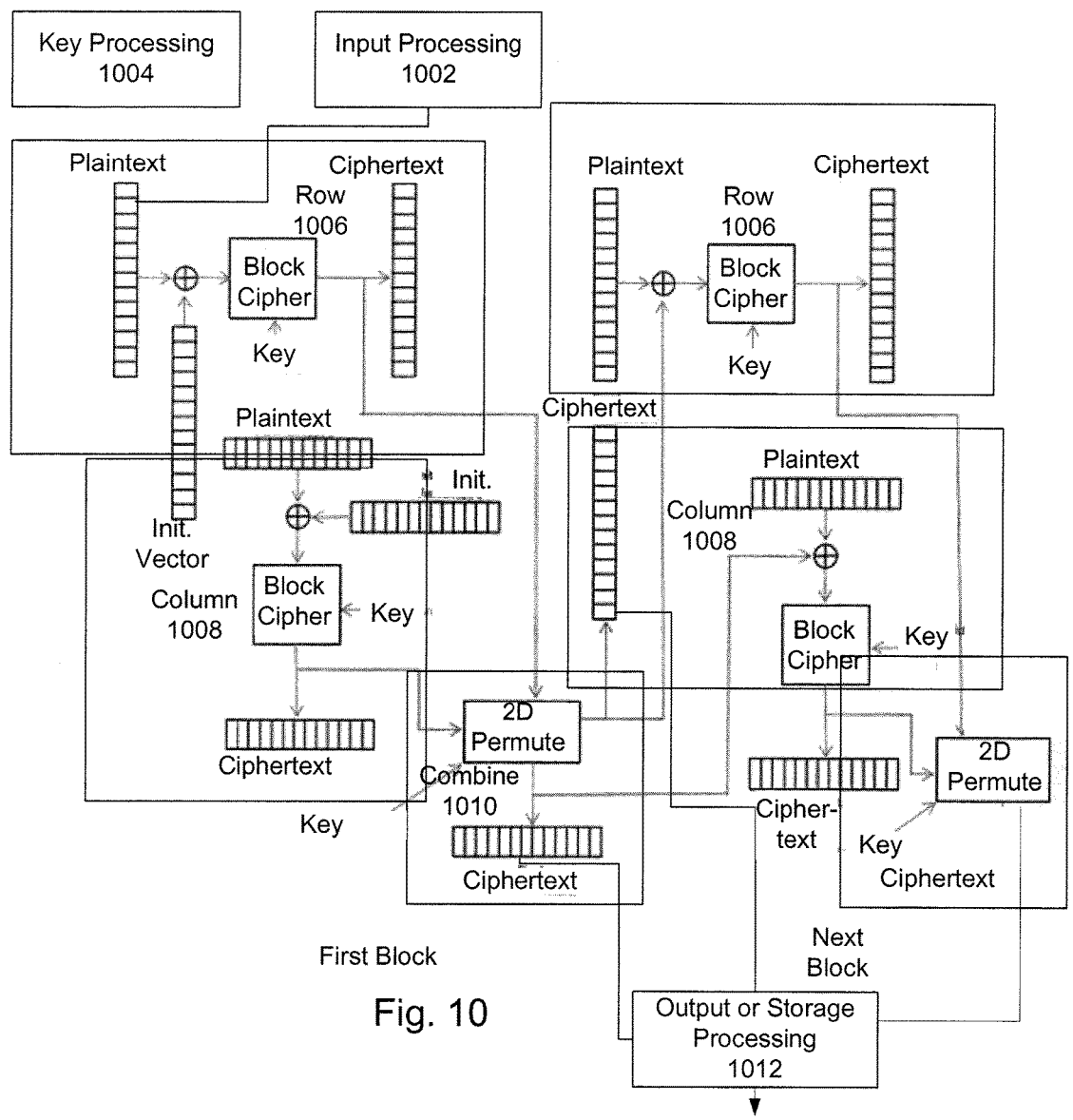
FIG. 10 is a block diagram illustrating how a two dimensional cross-session propagating, chaining, block cipher could have tasks allocated to multiple processors for parallel execution.

For high performance, we note that small processors having limited amounts of memory have become cheap, especially when compared to high-performance, high-speed machines. Encryption and decryption bandwidth requirements can be quite high, especially in encrypted data storage systems. In order to perform multidimensional encryption and decryption at high speed, consider the multidimensional propagating block chaining encryption mode of FIG. 6. The operations required can be divided into Input 1002 (FIG. 10), Key Processing 1004, Row Processing 1006, Column Processing 1008, Combining 1010, and Output or Storage Processing 1012 functions. While FIG. 10 is derived from FIG. 7, a similar division between plaintext input functions (not shown in some figures), row processing 608, 812, 912, 508, column processing 908, 936, 610, 808, 510, combining 824, 842, 928, 944, 612, 512 or output (not shown in some figures) functions associated with the embodiments of FIG. 6, 7, 8, or 9 as well. Each of these functional divisions can be assigned to separate hardware. Further, given that each row or column of plaintext in the embodiments of FIG. 4, 5, 6, or 7, or in the embodiments of FIG. 8 or 9 the initial vector, is processed through a block cipher transformation independent of other rows or columns of the same macroblock, row processing and column processing can each be divided among several hardware units of an array processor with each hardware unit of the array processor processing one or more rows, or one or more columns, of a total number of rows and columns. For example, but not limitation, an exemplary embodiment, having 128 columns and 128 rows, 32 row processors and 32 column processors are provided, each processor performing row or column processing for 4 rows. A physical hardware system may therefore resemble the parallel encryption system of FIG. 11.

Figure 11:
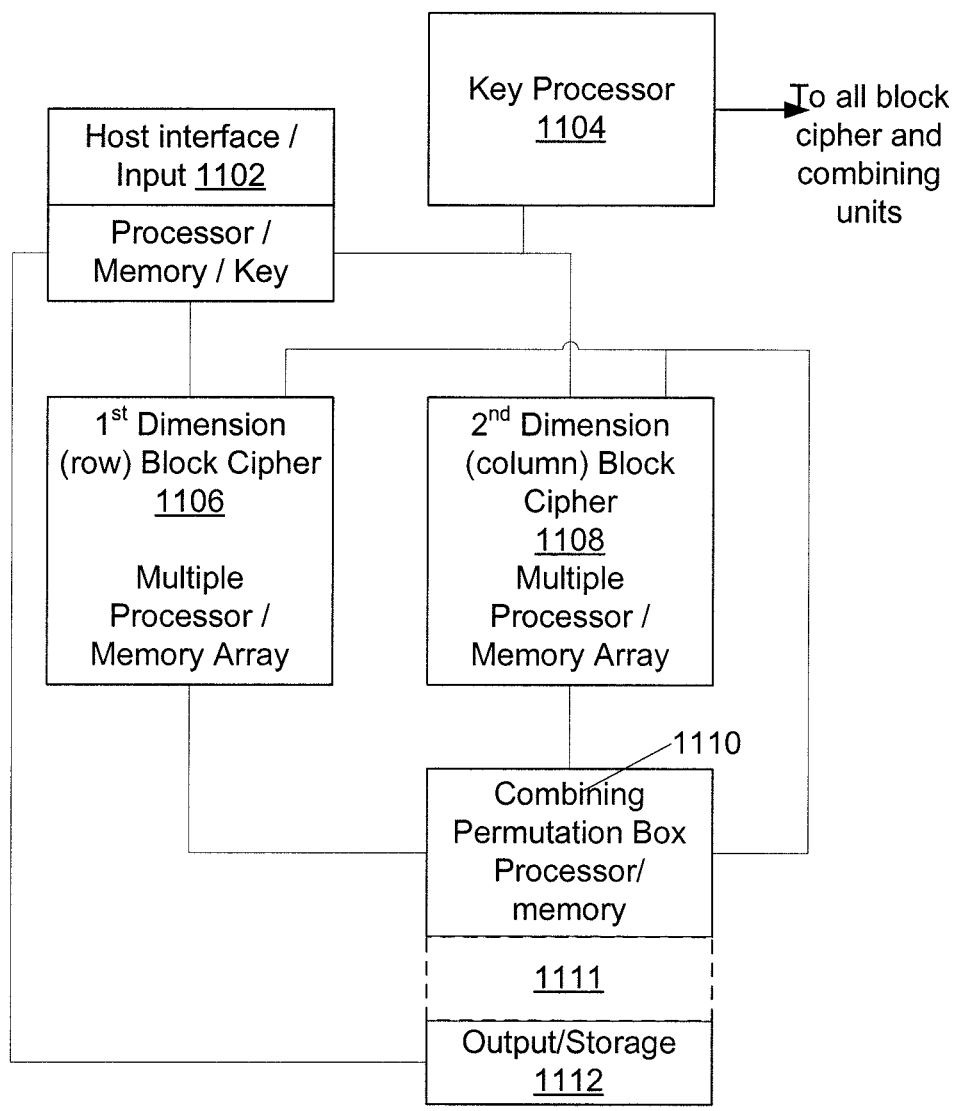
FIG. 11 is a block diagram of a system for implementing the block cipher of FIGS. 10 and 8 in a system for encrypting a communications or storage stream.

The parallel encryption system of FIG. 11 has a first hardware unit, host interface and input unit 1102 for receiving keys and plaintext data from communications equipment or a host computer. A second hardware unit 1104, which may include a processor, provides for key manipulations, including deriving macroblock keys from a master key, and for deriving individual row and column keys from the master key.

A third hardware unit 1106 processes rows, which in an embodiment is a single processor for encrypting all rows of a macroblock by executing a block cipher on each row, and in an alternative embodiment an array of processors where each processor executes the block cipher on one or more rows of the macroblock with the key. A fourth hardware unit 1108 processes columns, which in an embodiment is a single processor for encrypting all columns of a macroblock or initial vector by executing a block cipher on each column, and in an alternative embodiment an array of processors where each processor executes the block cipher on one or more columns of the macroblock.

A fifth hardware unit, combiner 1110, combines the columns and rows with transposition, permutation, and/or substitutions. In embodiments according to FIG. 9, a final data-encrypter hardware unit 1111 may be provided. Finally, a sixth hardware unit, output or storage interface unit 1112 outputs, encrypted data and/or stores that encrypted data on storage media.

A multiple-processor system similar to that of FIG. 11 may be used for decryption, and in an embodiment of a data storage system implementing the method of FIG. 9, output/storage interface unit 1112 reads encrypted data and uses the combined key generated by combiner 1110 to decrypt data; this data is transmitted to host interface/input unit 1102 for transmission to the host.

In a particular embodiment of a storage system, the initialization vector for the first macroblock of a file may be derived from the physical location of the first sector of the file to ensure a unique initialization vector for each file, and chaining is used from macroblock to macroblock of each file.

Figure 12:
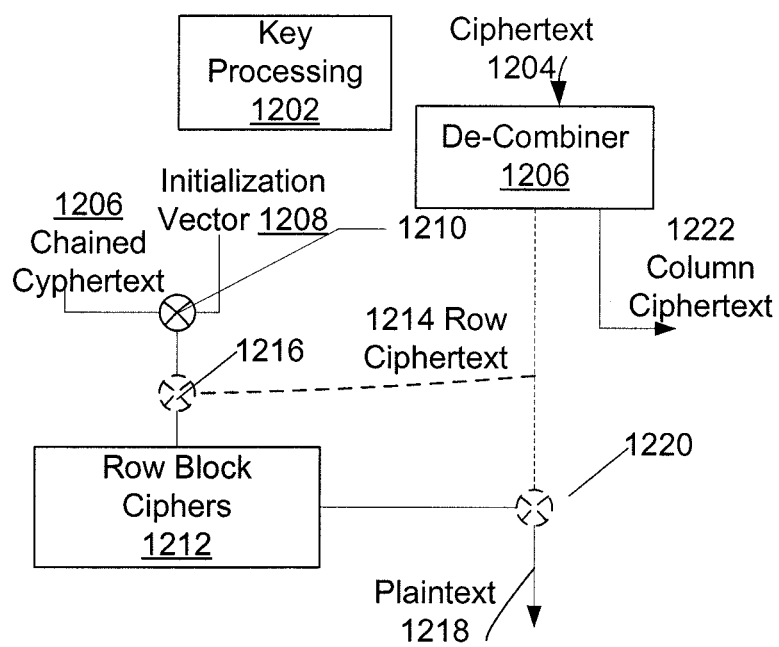
FIG. 12 is a block diagram of data flow illustrating decryption.

In a storage system embodiment implementing a method as illustrated with reference to FIG. 6 or 7, decryption operates roughly according to FIG. 12, on hardware as illustrated in FIG. 11, with key processing 1202 performed by key processor 1104 as for encryption. Ciphertext 1204 is received through storage interface 1112, and combiner 1110 operates its substitutions and permutations in reverse as a decombiner 1206 using the combining key to separate row and column ciphertext. Meanwhile, any chained ciphertext from a preceding macroblock and the initialization vector, which may include a file address, are processed by an encrypter 1210 in the same way these are processed during encryption to provide an initial vector for first dimension, or row processing processor array 1106. Row ciphertext 1214 in embodiments encrypted according to FIG. 4, 5, or 6 is processed 1216 with the initial vector to seed a row array, and row block cipher 1212 is operated on row processors 1106 in reverse to decrypt the macroblock to form plaintext 1218. In embodiments encrypted according to FIG. 7 or 8, the initial vector is used directly to seed the row array; row block cipher 1212 is operated on row processors 1106 using the row key as for encryption to generate a local key, which is used to decrypt 1220 to decrypt the row ciphertext 1214 to plaintext 1218. Plaintext 1218 is then transmitted through host interface 1102 to the host computer.

Since row ciphertext is redundant with column ciphertext, column ciphertext may be discarded during decryption in some embodiments, and in other, error-detecting embodiments, the column ciphertext 1222 may be processed on second dimension or column processors 1108 using the column key to form a column plaintext. The column plaintext is then compared to row plaintext to verify correct decryption.

In embodiments where column ciphertext is discarded, column processors 1108 may operate as additional row processors to provide decryption speed for storage systems where data reading is often done far more often than data writing.

A system as illustrated in FIG. 11 may be used for encrypting a data stream of a communications system or may be used for encrypting a data stream of a storage system where the ciphertext is stored on a storage medium. A multiple-processor system as herein described should be capable of encrypting or decrypting data at very high rates, such that storage system speed is not significantly impaired by the encryption and decryption process.

CONCLUSION

Using multi-dimensional encryption gives a higher level of security for all standard encryption modes. Higher dimensional versions of each common encryption mode are described which have the added benefit of permitting fast parallel execution.

Combinations

The concepts described herein may be combined in many ways in a product; the examples listed herein are exemplary and not by way of limitation. Among specific combinations of features anticipated herein are the following:

An encryption system designated A, having a least one processor and a memory system, the memory system configured to hold at least one macroblock, an encryption key, and machine readable instructions for encrypting the macroblock, where the machine readable instructions include instructions for dividing the macroblock into at least a first and a second subblock by rows; instructions for dividing the macroblock into at least a third and a fourth subblock by columns; instructions for deriving a first subkey, a second subkey, and a third subkey from the key; instructions for performing a block cipher on the first and second subblock according to row keys derived from the first subkey to produce first and second cipher blocks; instructions for performing the block cipher on the third and fourth subblock according to column keys derived from the second subkey to produce third and fourth cipher blocks; and instructions for performing a combining cipher of at least the first, second, third and fourth cipher blocks to produce a final ciphertext of the macroblock.

A system designated AA including the system designated A wherein there are at least two processors, and wherein the instructions for performing a block cipher on the first subblock are configured to execute on a different processor than the instructions for performing a block cipher on the third subblock.

A system designated AB including the system designated A or AA wherein there is a third processor, the third processor configured to execute machine readable instructions for generating a key for the processing a later macroblock of a sequence of macroblocks A system designated AC including the system designated A, AA, or AB wherein the machine readable instructions further comprise instructions for using at least part of the final ciphertext of the macroblock as at least part of a key for encrypting the later macroblock.

A system designated AD including the system designated A, AA, AB, or AC wherein the machine readable instructions further comprise instructions for using at least part of the final ciphertext of the macroblock as at least part of a key for encrypting a later macroblock of a sequence of macroblocks.

A system designated AE including the system designated A, AA AB, AC, or AD wherein the machine readable instructions further include instructions for subdividing the macroblock into at least one additional row subblock by rows, and into at least one additional column subblock by columns, for encrypting the additional row and column subblocks into at least an additional row and column encrypted subblock, and wherein the instructions for performing a combining cipher include instructions for using the additional row and column encrypted subblocks in the combining cipher to construct the final ciphertext.

A system designated AF including the system designated A, AA, AB, AC, AD, or AE wherein the machine readable instructions divide the macroblock into an equal number of rows and columns.

A system designated AF including the system designated A, AA, AB, AC, AD, AE, or AF, wherein the machine readable instructions further include instructions for subdividing the macroblock into at least a first and a second plane, where first, second, third, and fourth subblocks are within the first plane of the macroblock, where the machine readable instructions comprise instructions for subdividing the second plane of the macroblock into a fifth, and sixth subblock by rows, and into a seventh, and eighth subblock by columns; the machine readable instructions further comprise instructions for deriving a fourth subkey, a fifth subkey, and a sixth subkey from the key; the machine readable instructions further comprise instructions for performing a block cipher on the fifth and sixth subblock according to row keys derived from the fourth subkey to produce fifth and sixth cipher blocks; the machine readable instructions further comprise instructions for performing a block cipher on the seventh and eighth subblock according to column keys derived from the fifth subkey to produce seventh and eighth cipher blocks; and wherein the machine readable instructions for performing a combining cipher include the fifth, sixth, seventh, and eighth cipher blocks in generating the final ciphertext.

A system designated AH including the system designated A, AA, AB, AC, AD, AE, or AG, wherein a portion of a final ciphertext of a prior message is incorporated into the key.

A method of encryption designated B using a least one processor and at least one memory system, the memory system configured to hold at least one macroblock, an encryption key, and machine readable instructions for encrypting the macroblock, including: dividing the macroblock into at least a first and a second subblock by rows; dividing the macroblock into at least a third and a fourth subblock by columns; deriving a first subkey, a second subkey, and a third subkey from the key; performing a block cipher on the first and second subblock according to row keys derived from the first subkey to produce first and second cipher blocks; performing a block cipher on the third and fourth subblock according to column keys derived from the second subkey to produce third and fourth cipher blocks; and performing a combining cipher of the first, second, third and fourth cipher blocks to produce a final ciphertext of the macroblock.

A method designated BA including the method designated B wherein the system comprises at least two processors, and the performing a block cipher on the first subblock is performed by a different processor than the performing a block cipher on the third subblock.

A method designated BB including the method designated B or BA further including using at least part of the final ciphertext of the macroblock as at least part of a key for encrypting a following macroblock of a sequence of macroblocks.

A method designated BC including the method designated BB wherein there is a third processor, the third processor configured to execute machine readable instructions for generating a key for the processing the following macroblock of the sequence of macroblocks.

A method designated BD including the method designated BB further comprising subdividing the macroblock into at least one additional row subblock by rows, and into at least one additional column subblock by columns, encrypting the additional row and column subblocks into at least an additional row and column encrypted subblock, and wherein the combining cipher includes the additional row and column encrypted subblocks in the combining cipher to construct the final ciphertext.

A method designated BE including the method designated B, BA, BB, BC, or BD wherein the macroblock is divided into an equal number of rows and columns.

A method designated BF, including the method designated B, BA, BB, BC, BD, or BE, wherein the macroblock is subdivided into at least a first and a second plane, where first, second, third, and fourth subblocks are within the first plane of the macroblock, and further including dividing the macroblock into a fifth, and sixth subblock by rows, and into a seventh, and eighth subblock by columns; deriving a fourth subkey, a fifth subkey, and a sixth subkey from the key; performing the block cipher on the fifth and sixth subblock according to row keys derived from the fourth subkey to produce fifth and sixth cipher blocks; performing the block cipher on the seventh and eighth subblock according to column keys derived from the fifth subkey to produce seventh and eighth cipher blocks; and wherein the combining cipher includes the fifth, sixth, seventh, and eighth cipher blocks in generating the final ciphertext.

A method designated BG, including the method designated B, BA, BB, BC, BD, BE, or BF, wherein a portion of a final ciphertext of a prior sequence of macroblocks is incorporated into the key.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A multiprocessor encryption system comprising a plurality of processors and memory, the memory configured to hold at least one macroblock of bits of plaintext, an encryption key, and machine readable instructions for encrypting the macroblock, the machine readable instructions comprising:
    instructions executable by at least one of the processors and configured to create a macroblock array having a first dimension including a plurality of row subblocks and a second dimension including a plurality of column subblocks, each bit of the macroblock appearing in at least one of the plurality of row subblocks and at least one of the plurality of column subblocks;
    instructions executable by one of the plurality of processors and configured to derive a row key for each respective row subblock and a column key for each respective column subblock;
    instructions executable by a first set of the plurality of processors and configured to perform a respective block cipher on the row subblocks according to the respective row key to produce respective row cipher blocks;
    instructions executable by a second set of the plurality of processors and configured to perform respective block cipher on the column subblocks according to the respective column key to produce respective column cipher blocks; and
    instructions executable by one of the plurality of processors and configured to perform a combining cipher of at least the row cipher blocks, and the column cipher blocks to produce a final ciphertext of the macroblock;
    at least one of: a) outputting the final ciphertext to a communications channel and b) storing the final ciphertext at a data storage;
    wherein encryption time of the first and second dimensions collectively is not double the encryption time of the first and second dimensions individually.

2. The system of claim 1, a third set of the plurality of processors configured to execute machine readable instructions for generating a second encryption key for the processing a later macroblock of a sequence of macroblocks.

3. The system of claim 2, the machine readable instructions further comprising instructions configured to use at least part of the final ciphertext as at least part of the second encryption key.

4. The system of claim 1, the machine readable instructions further comprising instructions configured to use at least part of the final ciphertext as at least part of a second encryption key for encrypting a later macroblock of a sequence of macroblocks.

5. The system of claim 1, the machine readable instructions comprising instructions configured to subdivide the macroblock into a second portion having a plurality of second portion row subblocks by rows, and a plurality of second portion column subblocks by columns, and to encrypt the second portion row and column subblocks into at least second portion row encrypted subblocks and second portion column encrypted subblocks, and wherein the instructions that perform a combining cipher include instructions configured to use the second portion row encrypted subblocks and second portion column encrypted subblocks in the combining cipher to construct the final ciphertext.

6. The system of claim 1, the machine readable instructions configured to create a macroblock array having an equal number of row and column subblocks.

7. The system of claim 6, the instructions to create the macroblock array including instructions that (a) create a three-dimensional macroblock array such that the plurality of row and column subblocks are at a first depth within the three-dimensional macroblock array, and an additional plurality of row and column subblocks are at a second depth of the three-dimensional array; and
    (b) repeat, respectively for each of the additional plurality of row and column subblocks, generating a respective row and column key, and perform a respective block cipher to generate an additional row and column cipher blocks,
    the step of performing the combining cipher including performing a combining cipher of the row cipher blocks, the column cipher blocks, the additional row cipher blocks, and the additional column cipher blocks to create the final ciphertext.

8. The system of claim 7, the final ciphertext being three times the size of the plaintext.

9. The system of claim 1, a portion of the final ciphertext of a prior message being incorporated into the encryption key.

10. The system of claim 1, the final ciphertext being twice the size of the plaintext.

11. The system of claim 1, further comprising instructions configured to
    perform at least one additional cipher block on at least one additional dimension of the plaintext to produce additional dimension cipher blocks, and
    combine the additional dimension cipher blocks into the final ciphertext,
    each additional dimension cipher block being performed by a respective additional set of the plurality of processors such that encryption time does not increase proportional to the number of additional dimensions.

12. A method of multidimensional encryption using a plurality of processors and at least one memory system, the memory system configured to hold at least one macroblock of bits of plaintext, an encryption key, and machine readable instructions for encrypting the macroblock, comprising:

with at least one of a plurality of processors, creating a macroblock array having a first dimension including a plurality of row subblocks and a second dimension including a plurality of column subblocks, each bit of the macroblock appearing in at least one of the plurality of row subblocks and at least one of the plurality of column subblocks;

with at least one of the plurality of processors, deriving a row key respectively for each of the row subblocks and a column key respectively for each of the column subblocks;

with a first set of the plurality of processors, for each of the plurality of row subblocks performing a respective block cipher according to the respective row key to produce respective row cipher blocks;

with a second set of the plurality of processors different from the first set of the plurality of processors, for each of the plurality of column subblocks performing a respective block cipher according to the respective column key to produce respective column cipher blocks; and with at least one of the plurality of processors, performing a combining cipher of the respective row and column cipher blocks to produce a final ciphertext of the macroblock;

at least one of: a) outputting the final ciphertext to a communications channel and b) storing the final ciphertext at a data storage;

wherein encryption time of the first and second dimensions collectively is not double the encryption time of the first and second dimensions individually.

13. The method of claim 12, further comprising using at least part of the final ciphertext of the macroblock as at least part of a second encryption key for encrypting a following macroblock.

14. The method of claim 12, generating, within a third set of the plurality of processors, a second encryption key for the processing a following macroblock of the sequence of macroblocks.

15. The method of claim 12, further comprising
    subdividing the macroblock into at least one additional row subblock by rows, and into at least one additional column subblock by columns,
    encrypting the additional row and column subblocks into at least an additional row and an additional column encrypted subblock, and
    wherein the combining cipher includes the additional row and additional column encrypted subblocks in the combining cipher to construct the final ciphertext.

16. The method of claim 12, the step of creating the macroblock array including creating an equal number of row subblocks and column subblocks.

17. The method of claim 12,
    the step of creating the macroblock array including creating a three-dimensional macroblock array such that the plurality of row and column subblocks are at a first depth within the three-dimensional macroblock array, and an additional plurality of row and column subblocks are at a second depth of the three-dimensional array; and,
    repeating, for each of the additional plurality of row and column subblocks, the steps of generating row and column keys, and the steps of performing a respective block cipher to generate an additional row and column cipher blocks,
    the step of performing a combining cipher including performing a combining cipher of the row cipher blocks, the column cipher blocks, the additional row cipher blocks, and the additional column cipher blocks to create the final ciphertext.

18. The method of claim 17, the final ciphertext being three times the size of the plaintext.

19. The method of claim 12, a portion of a final ciphertext of a prior sequence of macroblocks being incorporated into the encryption key.

\* \* \* \* \*